Patented June 18, 1940

2,204,544

UNITED STATES PATENT OFFICE 2,204,544

SULPHONATED INDOLE DERIVATIVES

Kurt Engel, St. Louis, Ht. Rhin, France, assignor to J. R. Geigy S. A., Basel, Switzerland No Drawing. Original application May 12, 1937, Serial No. 142,284. Divided and this application April 11, 1938, Serial No. 201,423. In Switzerland May 14, 1936

5 Claims. (Cl. 260—319)

This application is a division of my application Ser. No. 142,284, filed May 12, 1937.

According to this invention, new water soluble derivatives of the heterocyclic series are made by treating with a sulphonating agent under mild conditions (i. e. not substantially over 25° C., such that no or substantially no colored byproducts are formed) compounds of the following general structure

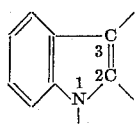

which contain in position 1 or 2 a high molecular aliphatic or an alicyclic substituent with more than five carbon atoms, and which may be substituted in the free positions of the benzene nucleus in any desired manner, and in the remaining free positions 1, 2 and 3 by alkyl-, aralkyl- or aryl-groups. The term "alicyclic" is to be understood to include substituents which are derived from aromatic groups by hydrogenation.

As parent materials to be subjected directly or indirectly to sulphonation there come into question indoles substituted in position 1 or 2 by a high molecular aliphatic- or alicyclic-group having more than five carbon atoms. These compounds which are in part new can be obtained by methods known for the production of indoles; thus they may easily be prepared by splitting off water from acylated orthotoluidides by means of sodium alcoholate at temperatures up to about 320° C. (according to Madelung, Ber., volume 45, page 1128), or by means of sodamide at a somewhat lower temperature (according to Verley, Bull. de la Soc. Chim. 1924 and 1925 and British Specification No. 303,467). However, other processes for preparing indole and its substitution products may be used with equally good results.

Some methods of preparation of some parent materials for the sulphonation which have not hitherto been known will now be briefly indicated:

One general method consists in acylating with a carboxylic acid or a suitable derivative thereof an aromatic ortho-alkyl-substituted amine which, besides the alkyl-group in ortho-position, may contain in the benzene nucleus other substituents such as alkyl-groups and whose aminogroup may be either a primary or secondary one containing alkyl-, aralkyl- or aryl-groups, and then subjecting the acylamide to condensation to produce the indole ring according to the usual methods.

According to whether the aliphatic or alicyclic radical of high molecular weight is to be present in position 1 or 2 of the indole ring, one of the following procedures must be followed:

(1) The high molecular aliphatic or alicyclic radical is to occupy position 1 in the indole.

An aliphatic or alicyclic radical containing more than five carbon atoms is introduced into an ortho-alkyl-substituted primary amine. The manner in which the 2-position is to be substituted after the indole condensation, whether by hydrogen or by an alkyl-, an aralkyl- or an arylradical, determines the carboxylic acid which must be used for the acylation. For example, N-dodecyl-ortho-toluidine may be formylated or acetylated and the product subjected to the indole fusion; in the first case there is obtained 1-dodecyl-indole, and in the second case 1-dodecyl-2-methyl-indole. Instead of the dodecyl radical there may be introduced a mixed alkyl-group corresponding with lorol (that is the mixture of alcohols obtainable by the catalytic reduction of coconut fatty acids), the radical of olein-alcohol or another unsaturated alcohol, or the radical of a naphthene-alcohol, a terpene-alcohol, or cyclohexanol is also applicable. If instead of a formyl- or acetyl-radical there is introduced a phenylacetyl-, phenoxyacetyl- or benzoyl-radical, there will be present in 2-position after the indole ring closure a benzyl-, phenoxymethyl- or phenyl-group. Instead of ortho-toluidine there may be used as parent material ortho-aminoethylbenzene, meta- or paraxylidine, mesidine or other homologues of the ortho-methyl-aminobenzene.

(2) The high molecular aliphatic or alicyclic radical is to occupy position 2 in the indole.

In this case one starts from an ortho-alkylsubstituted primary or secondary (alkyl-, aralkyl- or aryl-substituted) amine, acylates with a fatty acid of high molecular weight such as stearic acid, palmitic acid, oleic acid, hydrogenized codliver oil fatty acid, hydrogenized soya bean fatty acid, palm-nut oil fatty acid, coconut fatty acid, naphthenic acid, resin-acid, campholic acid, fencholic acid, cyclohexane-carboxylic acid or the like, or with a suitable derivative of such an acid, and then brings about ring closure to the indole. For example, meta-xylidine may first be converted into mono-N-benzyl-meta-xylidine which may be then acylated with palm-nut oil fatty acid, and the product fused with sodiumethylate. There is obtained the hitherto unknown 1-benzyl-2-undecyl-(mixed with lower and higher radicals)-5-methyl-indole.

The following is a more precise description given in illustration of the manner of preparing the indoles, the parts being by weight:

4.6 parts of sodium are dissolved in 50 parts of absolute alcohol and distilled until half the solvent used has been evaporated, whereupon 30 parts of palm-nut fatty acid ortho-toluidide are added and the whole well mixed together. Then the mixture is slowly heated to 300° C. with efficient stirring. Ethylalcohol first distils, and after this has been expelled the reaction mixture constitutes a yellow semi-solid mass. The splitting off of water occurs at a temperature range of 290–320° C.; it is accompanied by strong foaming and is complete as soon as the melt has become quiescent, the operation requiring about half an hour. After the reaction mass has cooled it is introduced into water, acidified with acetic acid, and the indole is separated or extracted by means of an organic extracting agent, and if required is distilled in a high vacuum (boiling point 120–210° C. under 0.0 mm. pressure).

The indole mixture thus obtained is a yellowish-white crystalline mass having a low melting point and a fecal odour. It forms a red picrate.

The yield obtained by this method is very good, a fact which is somewhat surprising since it was not to be expected that the acylated ortho-toluidine containing a radical of high molecular weight would withstand the rather high temperature of the indole fusion with alcoholate without suffering saponification to an appreciable degree. Very good yields are likewise obtained with the use of sodamide.

If in carrying out the foregoing process instead of the ortho-toluidide of palm-nut fatty acid there is used another ortho-toluidide such as that of an unsaturated or saturated fatty acid, or a mixture thereof such as oleic acid, stearic acid, hydrogenized codliver oil fatty acid or hydrogenized soya bean fatty acid and so on, or a N-substitution product of such toluidide, for example N-benzyl stearic acid-ortho-toluidide, N-palm-nut fatty acid -N-ethyl-ortho-toluidide, N-aceto-N-lauryl-ortho-toluidide and so on, the corresponding indoles are obtained according to the same course of reaction. They are all yellowish-white masses and, owing to their generally non-uniform nature, resemble very closely the indole mixture above described.

The following examples illustrate the invention, the parts being by weight unless otherwise stated, and the parts by weight and the parts by volume being related in the same manner as the kilo and the liter.

*Example 1*

60 parts of indole prepared from palm-nut fatty acid ortho-toluidide are gradually introduced into 60 parts of sulphuric acid monohydrate at a temperature between 10 and 20° C. while stirring. The solution is cooled to 5° C. and 120 parts of oleum of 26 per cent strength are allowed to drop in slowly. After the whole has been stirred for 4 hours at a temperature below 10° C. a sample withdrawn from the mixture and neutralized proves to be completely soluble in water. As soon as this is the case the reaction mixture is poured on to ice, the free sulphonic acid which is precipitated is separated and neutralized by the addition of caustic soda solution. By evaporation the sodium salt is obtained in the form of a slightly colored powder which is very easily soluble in water and forms solutions which foam strongly. The alkaline earth salts of the new product are also easily soluble in water.

A product having similar properties is obtained by causing 120 parts of monohydrate and 60 parts of oleum of 66 per cent strength to act on 60 parts of the same indole under the conditions above indicated, or by introducing 1 part of the indole into a mixture of 5 parts of monohydrate and 5 parts of chlorosulphonic acid at 10° C., stirring for 14 hours, and working up as above indicated.

*Example 2*

20 parts of the 2-heptadecylindole obtained by fusion with sodium-alcoholate of the ortho-toluidide of technical stearic acid are introduced into 30 parts of sulphuric acid monohydrate at 10° C. while stirring, 30 parts of oleum of 26 per cent strength and afterwards 10 parts of oleum of 66 per cent strength are slowly dropped in, and the whole is stirred for 6 hours at 20° C. The reaction mixture is then poured on ice, the free sulphonic acid which precipitates is separated, neutralized with alkali and evaporated. There is obtained a white powder.

If instead of the 2-heptadecylindole the corresponding 3-phenyl derivative (made from the stearoylamide of the following formula

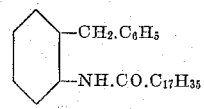

prepared by acylating ortho-aminodiphenylmethane with the acid chloride of technical stearic acid) is used, a similar product is finally obtained by sulphonation.

*Example 3*

15 parts of α-heptadecenyl-indole are introduced into a mixture of 30 parts of sulphuric acid monohydrate and 30 parts of chlorosulphonic acid at 10° C. and the whole is stirred at this temperature for 14 hours. As soon as a sample withdrawn from the mixture and neutralized is soluble in water, the reaction mass is poured on to ice and the precipitated sulphonic acid is separated and neutralized. There is obtained after evaporation a white powder which in aqueous solution has good properties of capillary activity.

A similar sulphonate is obtained by dissolving 15 parts of heptadecenyl-indole in 45 parts by volume of ether, cautiously dropping in 45 parts of chloro-sulphonic acid, and stirring for 6 hours at 20–25° C. The product is worked up as above indicated.

*Example 4*

15 parts of an indole prepared from hydrogenized codliver oil fatty acid-benzyl-ortho-toluidide are introduced gradually whilst stirring into 30 parts of sulphuric acid monohydrate at 5° C. and the mixture is stirred between 5 and 15° C. until dissolution has occurred. Then at a temperature below 5° C. 30 parts of oleum of 26 per cent. strength are slowly dropped in, the temperature is slowly allowed to rise to room temperature, and the whole is stirred for 14 hours. The reaction mixture is poured on to ice, the precipitated sulphonic acid is separated, neutralized, and evaporated. There is obtained a white powder having good properties of capillary activity.

Instead of the indoles of the above examples there may be used other indoles such as those disclosed above, or for example the 1-lauryl-2.3-dimethyl-indole, the 1-phenyl-2-heptadecylindole, the 1-stearyl- or -cetyl-2-phenylindole, the indoles from benzoyl-dodecyl-o-toluidide, from N-benzyl-ortho-toluidide of hydrogenized soyabean fatty acid, from the N-methyl-ortho-toluidide of naphthenic acid, campholic acid, fencholic acid, cyclohexane-carboxylic acid or their homologues derived from m-xylidine, mesidine. The products obtained are of quite similar properties.

The new sulphonic acids and their salts obtained as described in the foregoing examples find application as capillary active agents, especially as wetting, dispersing, emulsifying, penetrating and washing agents, and in particular for emulsifying lime soaps. They are also useful as agents for softening, dressing and so on.

What I claim is:

1. Preparations of high capillary activity, and particularly characterized by their capacity for emulsifying lime-soaps, said preparations containing as essentially active ingredient a water-soluble salt of the indole sulphonic acid of the following general formula:

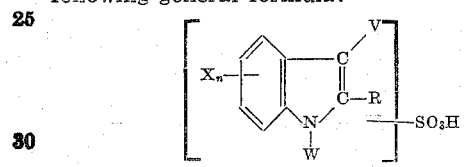

wherein R represents a high molecular aliphatic radical with more than 5 carbon atoms, W represents a member of the group consisting of H, alkyl, benzyl and phenyl, V represents a member of the group consisting of H, alkyl, benzyl and phenyl, and X represents a member of the group consisting of H and methyl, $n$ being 1 or 2, whereby a high capacity for emulsifying lime-soaps is imparted to said preparations.

2. Preparations of high capillary activity, and particularly characterized by their capacity for emulsifying lime-soaps, said preparations containing as essentially active ingredient a water-soluble salt of the indole sulphonic acid of the following general formula:

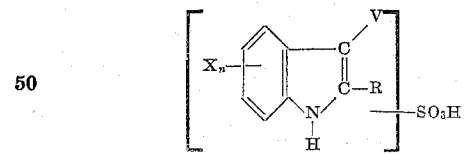

wherein R represents a high molecular aliphatic radical with more than 5 carbon atoms, V represents a member of the group consisting of H, alkyl, benzyl and phenyl, and X represents a member of the group consisting of H and methyl, $n$ being 1 or 2, whereby a high capacity for emulsifying lime-soaps is imparted to said preparations.

3. Preparations of high capillary activity, and particularly characterized by their capacity for emulsifying lime-soaps, said preparations containing as essentially active ingredient a water-soluble salt of the indole sulphonic acid of the following general formula:

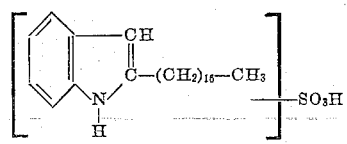

wherein a high capacity for emulsifying lime-soaps is imparted to said preparations.

4. Preparations of high capillary activity, and particularly characterized by their capacity for emulsifying lime-soaps, said preparations containing as essentially active ingredient a water-soluble salt of the indole sulphonic acid of the following general formula:

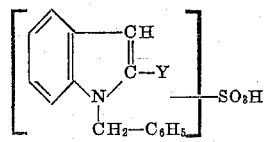

wherein Y represents the radical attached to the carboxylic group in the fatty acid of palm-nut oil, whereby a high capacity for emulsifying lime-soaps is imparted to said preparations.

5. Preparations of high capillary activity, and particularly characterized by their capacity for emulsifying lime-soaps, said preparations containing as essentially active ingredient a water-soluble salt of the indole sulphonic acid of the following general formula:

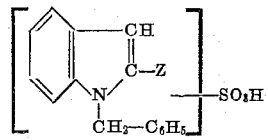

wherein Z represents the radical attached to the carboxylic group in the fatty acid of hydrogenized cod-liver oil, whereby a high capacity for emulsifying lime-soaps is imparted to said preparations.

KURT ENGEL.